June 24, 1969  J. CLARE ET AL  3,451,716
RETAINER ASSEMBLY FOR VEHICLE BODIES
Filed May 28, 1968
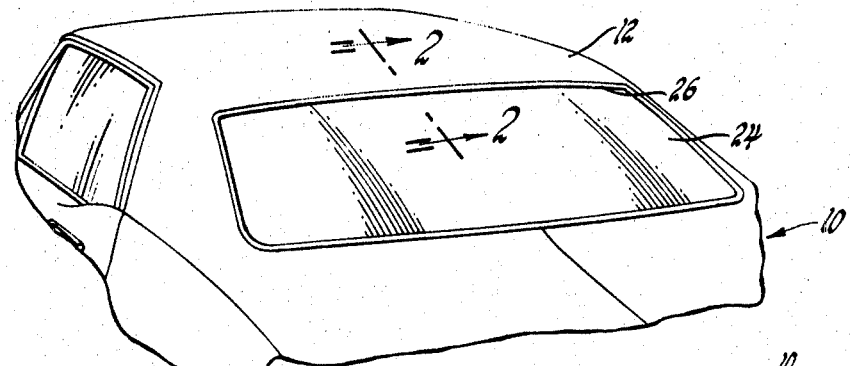
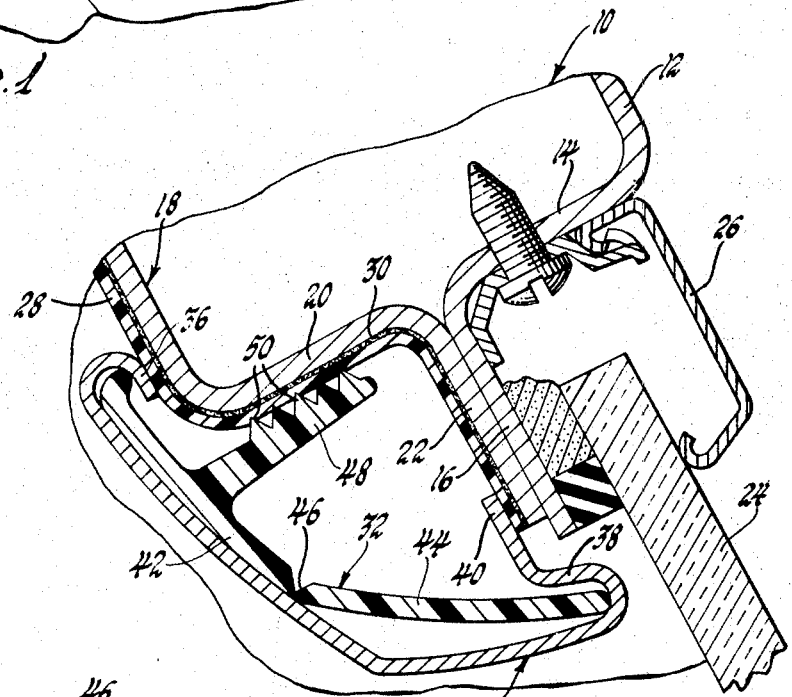
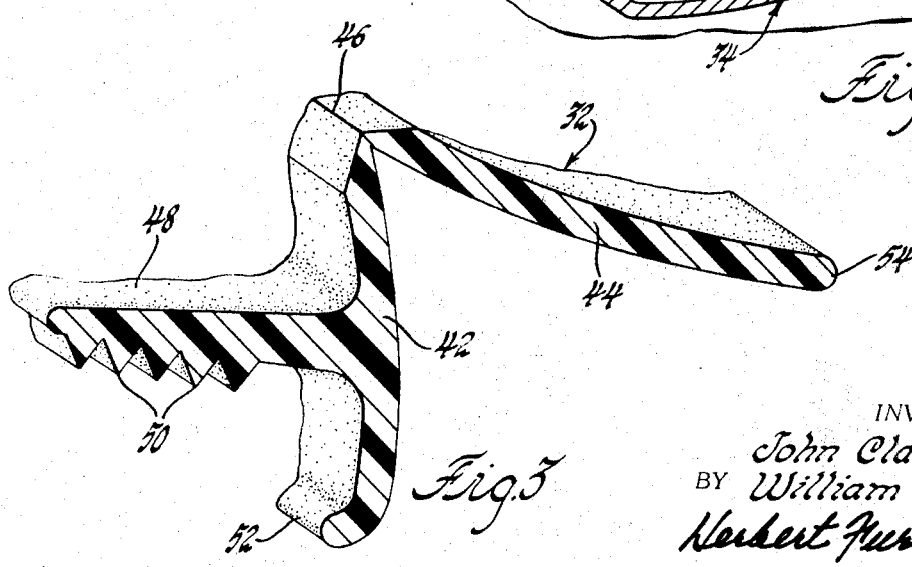
INVENTORS
John Clare &
BY William G. Crary
Herbert Furman
ATTORNEY

United States Patent Office 3,451,716
Patented June 24, 1969

3,451,716
RETAINER ASSEMBLY FOR VEHICLE BODIES
John Clare, Fraser, and William G. Crary, Utica, Mich., assignors to General Motors Corporation, Detroit, Mich., a corporation of Delaware
Filed May 28, 1968, Ser. No. 732,561
Int. Cl. B62d 25/06; B60j 1/18
U.S. Cl. 296—137          3 Claims

ABSTRACT OF THE DISCLOSURE

A flanged vehicle body header is covered by headlining. A headlining retainer includes a pair of integrally hinged members snapped into a garnish molding mounted on the header. The retainer includes a deflectable serrated extension engaging the headlining to hold the headlining against the flange of the header.

---

This invention relates to the attachment of headlining to vehicle bodies and more particularly to a headlining retainer assembly for vehicle bodies.

Conventionally the inner surface of the body roof panel is concealed by fabric material caller headlining. The headlining is anchored to the windshield header, attached to a number of listing wires which span the roof panel between the side roof rail members, and pulled taut against the windshield header anchor, and then both cemented and mechanically secured to the backlite or rear window header.

The mechanical securement of the headlining to the rear window header presents problems since it must be easily done without causing wrinkles and must be secure against the tension of the headlining.

The retainer assembly of this invention secures the edge portion of the headlining to the rear window header in a very simple and expedient manner and does not require any special tools. In the preferred embodiment of the invention, a plastic retainer is self-retained within the garnish molding by overcenter action and includes an integral ribbed extension which deflectably engages the edge portion of the headlining to securely hold it against a flange of the header member to which it is cemented. The retainer is extruded of suitable material, such as polypropylene, and includes a pair of integrally hinged members. Normally these members are biased to a partially folded position to one side of the retainer so that the edges of the members can be inserted within the return bent edges of the molding. Upon movement of the retainer within the molding, the members are partially folded to the other side of the retainer and the overcenter bias thereafter maintains the retainer within the molding. The retainer and molding are preassembled as a unit and the molding thereafter mounted on the body in a conventional manner to secure the edge portion of the headlining to the header.

The primary object of this invention is to provide an improved retainer assembly for securing headlining to a vehicle body header. Another object of this invention is to provide such a retainer assembly which includes a retainer preassembled within a body molding and engaging the headlining to hold the headlining against the body header when the molding is mounted on the body.

These and other objects of this invention will be readily apparent from the following specification and drawings wherein:

FIGURE 1 is a partial rear perspective of a vehicle body having the rear edge portion of the headlining thereof secured to the rear window header by a retainer assembly according to this invention;

FIGURE 2 is an enlarged sectional view taken generally along the plane indicated by line 2—2 of FIGURE 1; and FIGURE 3 is a partial perspective view of a portion of the retainer.

Referring now to the drawings, a vehicle body designated generally 10 includes a roof panel 12. The rear edge portion of the roof panel includes a lateral flange 14 which joins to a lateral flange 16. The body or rear window header 18 includes a lateral flange 20 which joins to a lateral flange 22 welded to the flange 16 to provide a body pinchweld. The rear window 24 of the body has its upper edge portion adhesively secured to the flanges 16 and 22, and a molding 26 covers this edge portion of the window. The details of the manner in which the window 24 is secured to the flanges 16 and 22 are not necessary to an understanding of this invention and reference may be had to Coppock 3,241,277, issued Mar. 22, 1966, and assigned to the assignee of this invention, for such details.

The inner surface of the roof panel 12 is concealed by headlining 28 which extends from the front window or windshield header, not shown, to the header 18 and is supported between these headers by conventional listing wires, not shown. When the headlining is mounted on the body, the front edge portion thereof is secured to the windshield header, the intermediate portion is secured to the listing wires, and then the headlining is pulled taut toward the rear of the body. As shown in FIGURE 2, the rear edge portion of the headlining covers the header 18 and the flanges 20 and 22, although with normal manufacturing tolerances, the headlining can terminate short of the flange 22.

In order to secure the rear edge portion of the headlining, it is first cemented at 30 to the header 18 and to the flanges 20 and 22 thereof, and is thereafter additionally secured by a retainer 32 and a molding 34 which provide a retainer assembly according to this invention. The molding 34 is of generally arcuate cross section opening to the header 18 and includes return bent flanges 36 and 38 at the edge portions thereof. In the specific embodiment shown, a lateral flange 40 extends from the return bent flange 38 and additionally engages the edge portion of the headlining, although this does not necessarily occur in all installations due to manufacturing tolerances. The retainer 32 is of extruded polypropylene plastic material and includes hinge members 42 and 44 which are integrally hinged to each other along a groove or hinge line 46. A lateral extension 48 is provided on the hinge member 42 and the extension includes a number of ribs or serrations 50 which extend from one surface of the extension.

As can be seen in FIGURE 3, the hinge members 42 and 44 are normally located in a partially folded position to one side of the retainer and extent between the respective edge portions 52 and 54 thereof is generally equal to the extent between flanges 36 and 40 so that the retainer can be slipped between these flanges and into the concavity of the molding 34 with no or very little additional folding. Thereafter pressure is applied at the integral hinge line 46 to move the edge portions 52 and 54 of the retainer within the return bent flanges 36 and 38 as the hinge members 42 and 44 unfold relative to each other and then partially fold to the other side of the retainer after they move through a generally aligned position. The hinge member 42 moves into engagement with the inner surface of the molding 34 and the normal bias of the hinge members and the anchoring of the edge portions 52 and 54 thereof within the bent flanges 36 and 38 self-retains the retainer within the molding. The retainer is preassembled with the molding prior to installation of the molding on the body and this provides for increased ease of installation.

After the retainer 32 and the molding 34 are preassembled and the headlining 28 mounted on the body, the molding 34 is mounted on the body in any suitable manner, conventionally by screws. When the molding is mounted on the body, the extension 48 is deflected clockwise about its root connection to the hinge member 42 as it engages the portion of the headlining covering flange 20. The normal bias of the extension causes the serrations 50 to tightly engage the portion of the headliner covering the flange 20 to hold this portion of the headlining against the flange 20 and thereby secure the rear edge portion of the headlining to the body header. It will also be noted that the deflection of extension 48 tends to bias the hinge members 42 and 44 within the concavity of the molding 34.

It can be seen from the foregoing description that the headlining is secured in a very simple and expedient manner without requiring any special tools.

Thus, this invention provides an improved retainer assembly for vehicle bodies.

We claim:

1. In a vehicle body having a flanged member and flexible material covering the member and having the edge portion thereof terminating at the flange of the member, a retainer assembly for concealing the edge portion of the flexible material and the flange and holding the edge portion of the material against the flange comprising, in combination, an elongated generally transversely arcuate molding mounted on the body member and having an extent between the edge portions thereof sufficient to cover the edge portion of the material, the concavity of the molding opening to the flange, an elongated retainer including a pair of integrally hinged members normally biased to a partially folded position to one side of the retainer, means for rotatably anchoring the edge portion of each hinged member to an edge portion of the molding, the hinged members of the retainer being movable to a partially folded position to the other side of the retainer upon movement of the edge portions of the hinged members about the anchor means as the hinged members move within the concavity of the molding and into engagement with the surface thereof, the normal bias of the hinged members and the anchor means maintaining the retainer within the concavity of the molding, and means on one of the hinged members of the retainer engageable with the edge portion of the flexible material to hold the flexible material against the flange.

2. In a vehicle body having a flanged member and flexible material covering the member and having the edge portion thereof terminating at the flange of the member, a retainer assembly for concealing the edge portion of the flexible material and the flange and holding the edge portion of the material against the flange comprising, in combination, an elongated generally transversely arcuate molding mounted on the body member and having return bent edge portions and an extent between the edge portions sufficient to cover the edge portion of the material, the concavity of the molding opening to the flange, an elongated retainer including a pair of integrally hinged members normally biased to a partially folded position to one side of the retainer, the edges of the members being received within the return bent edges of the molding to rotatably anchor the retainer to the molding, the hinged members of the retainer being movable to a partially folded position to the other side of the retainer upon movement of the edge portions of the hinged members within the molding edge portions as the hinged members move within the concavity of the molding and into engagement with the surface thereof, the normal bias of the hinged members and the molding edge portions maintaining the retainer within the concavity of the molding, and an integral extension on one of the hinged members of the retainer engageable with the edge portion of the flexible material to hold the flexible material against the flange.

3. In a vehicle body having a flanged header member and flexible material covering the header and having the edge portion thereof terminating at the flange thereof, a retainer assembly for concealing the edge portion of the flexible material and the flange and holding the edge portion of the material against the flange comprising, in combination, an elongated generally transversely arcuate molding mounted on the header and having return bent edge portions and an extent between the edge portions thereof sufficient to cover the edge portion of the material, the concavity of the molding opening to the flange, an elongated retainer of plastic material including a pair of integrally hinged members normally biased to a partially molded position to one side of the retainer, the extent between the edges of the partially folded members being generally equal to that between the molding edge portions, the edges of the hinged members being slipped within the molding edge portions to rotatably anchor the hinged members to the molding, the hinged members of the retainer being movable to a partially folded position to the other side of the retainer upon movement of the hinged member edges within the molding edge portions as the hinged members move within the concavity of the molding and into engagement with the surface thereof, the normal bias of the hinged members and the molding edge portions maintaining the retainer within the concavity of the molding, and an integral extension on one of the hinged members of the retainer laterally deflectably engageable with the edge portion of the flexible material to hold the flexible material against the flange.

References Cited

UNITED STATES PATENTS

| | | | |
|---|---|---|---|
| 1,004,336 | 9/1911 | Athey | 296—93 |
| 2,814,525 | 11/1957 | Thomas | 296—28 |
| 3,065,022 | 11/1962 | Schutte | 296—137 |
| 3,195,948 | 7/1965 | Strutevant | 296—137 |
| 3,155,204 | 11/1964 | Campbell | 296—93 |

BENJAMIN HERSH, *Primary Examiner.*

ROBERT R. SONG, *Assistant Examiner.*

PO-1050
(5/69)

UNITED STATES PATENT OFFICE
CERTIFICATE OF CORRECTION

Patent No. 3,451,716          Dated June 24, 1969

Inventor(s) John Clare and William G. Crary

It is certified that error appears in the above-identified patent and that said Letters Patent are hereby corrected as shown below:

Column 1, line 26, "caller" should read -- called --.

Column 3, line 53, "concelaing" should read -- concealing --.

Column 4, line 31, "molded" should read -- folded --.

SIGNED AND
SEALED
APR 14 1970

(SEAL)
Attest:

Edward M. Fletcher, Jr.
Attesting Officer

WILLIAM E. SCHUYLER, JR.
Commissioner of Patents